US012056065B2

(12) United States Patent
Wang

(10) Patent No.: US 12,056,065 B2
(45) Date of Patent: Aug. 6, 2024

(54) ORTHOGONAL MULTI-PHASE SCHEDULING CIRCUITRY

(71) Applicant: Intel Corporation, Santa Clara, CA (US)

(72) Inventor: Qiang Wang, Palo Alto, CA (US)

(73) Assignee: Altera Corporation, San Jose, CA (US)

( * ) Notice: Subject to any disclaimer, the term of this patent is extended or adjusted under 35 U.S.C. 154(b) by 791 days.

(21) Appl. No.: 16/818,163

(22) Filed: Mar. 13, 2020

(65) Prior Publication Data

US 2020/0210112 A1 Jul. 2, 2020

(51) Int. Cl.
*G06F 13/16* (2006.01)

(52) U.S. Cl.
CPC ........ *G06F 13/161* (2013.01); *G06F 13/1642* (2013.01); *G06F 13/1689* (2013.01); *G06F 2213/1602* (2013.01)

(58) Field of Classification Search
None
See application file for complete search history.

(56) References Cited

U.S. PATENT DOCUMENTS

| | | |
|---|---|---|
| 5,890,200 A | 3/1999 | Merchant |
| 5,893,151 A | 4/1999 | Merchant |
| 8,169,950 B2 | 5/2012 | Shen et al. |
| 9,811,263 B1 * | 11/2017 | Teh ........................ G06F 3/0656 |
| 2002/0065981 A1 * | 5/2002 | Jenne .................... G06F 13/161 |
| | | 711/151 |
| 2003/0126356 A1 | 7/2003 | Gustavson et al. |
| 2010/0250841 A1 * | 9/2010 | Ikarashi .............. G06F 13/1689 |
| | | 711/E12.001 |
| 2011/0161713 A1 * | 6/2011 | Methar ................. G06F 1/3275 |
| | | 713/400 |
| 2016/0118088 A1 | 4/2016 | Lee et al. |
| 2018/0018291 A1 * | 1/2018 | Magro ................ G06F 13/1689 |
| 2019/0171598 A1 * | 6/2019 | Zhu .......................... G06F 1/08 |
| 2021/0375341 A1 * | 12/2021 | Xiao ...................... G11C 7/222 |

OTHER PUBLICATIONS

Adrian Cosoroaba. "Achieving High Performance DDR3 Data Rates in Virtex-7 and Kintex-7 FPGAs." Aug. 2012. Xilix. WP 383. Ver 1.1). (Year: 2012).*

* cited by examiner

*Primary Examiner* — Nathan Sadler
(74) *Attorney, Agent, or Firm* — InventIQ Legal LLP; Steven J. Cahill

(57) ABSTRACT

An integrated circuit may include orthogonal multi-phase scheduling circuitry. The scheduling circuitry may include a number of orthogonal scheduling circuits each of which is configured to receive different command types and to output a single winning command. The scheduling circuitry may further include a phase assignment circuit for receiving the winning commands from the orthogonal scheduling circuits and for assigning the received winning commands to different corresponding phase groups. Each orthogonal scheduling circuit may include command buffers, command arbiters, a global arbiter, and associated safe checking circuits.

20 Claims, 9 Drawing Sheets

700

Minimum command Interval (number of phases):

701 {
| From | Cmd0 | Cmd0 | Cmd0 | Cmd0 | Cmd0 |
|---|---|---|---|---|---|
| To | Cmd0 | Cmd1 | Cmd2 | Cmd3 | Cmd4 |
| Min Interval | 4 | 3 | 1 | 2 | 1 |

702

| From | Cmd1 | Cmd1 | Cmd1 | Cmd1 | Cmd1 |
|---|---|---|---|---|---|
| To | Cmd0 | Cmd1 | Cmd2 | Cmd3 | Cmd4 |
| Min Interval | 1 | 8 | 2 | 3 | 1 |

| From | Cmd2 | Cmd2 | Cmd2 | Cmd2 | Cmd2 |
|---|---|---|---|---|---|
| To | Cmd0 | Cmd1 | Cmd2 | Cmd3 | Cmd4 |
| Min Interval | 2 | 1 | 6 | 1 | 3 |

706

| From | Cmd3 | Cmd3 | Cmd3 | Cmd3 | Cmd3 |
|---|---|---|---|---|---|
| To | Cmd0 | Cmd1 | Cmd2 | Cmd3 | Cmd4 |
| Min Interval | 2 | 1 | 2 | 4 | 1 |

| From | Cmd4 | Cmd4 | Cmd4 | Cmd4 | Cmd4 |
|---|---|---|---|---|---|
| To | Cmd0 | Cmd1 | Cmd2 | Cmd3 | Cmd4 |
| Min Interval | 2 | 1 | 1 | 1 | 2 |

| From | Cmd4 | Cmd4 | Cmd4 | Cmd4 | Cmd4 |
|---|---|---|---|---|---|
| To | Cmd0 | Cmd1 | Cmd2 | Cmd3 | Cmd4 |
| Min Interval | 6 | 5 | 6 | 3 | 8 |

ORTHOGONAL MULTI-PHASE SCHEDULING CIRCUITRY

BACKGROUND

Integrated circuits are often provided with memory controllers for communicating with off-chip memory devices. Memory controllers typically include command schedulers that run at some fractional rate (i.e., half rate or quarter rate) of the actual interface speed. For example, consider a scenario in which the interface between an integrated circuit and an associated memory device runs at a higher clock rate of 1200 MHz (sometimes referred to as the interface clock speed). Each period of the interface clock is sometimes referred to as an interface clock cycle. In this example, the command scheduler within the integrated circuit may only run at 300 MHz (sometimes referred to as the command scheduler clock rate or internal clock rate).

In such scenarios, the command scheduler should be configured to send multiple commands to the interface during each internal clock cycle to take full advantage of the available interface bandwidth. Issuing multiple commands per internal clock cycle, however, substantially increases the complexity of the command scheduler such that it is very difficult, if not impossible, to satisfy timing constraints at the desired operating speed, while also dramatically increasing the area and power consumption of the scheduler.

In order to meet the targeted speed and area/power budgets, conventional command schedulers only send one command per internal clock cycle. Sending only one command during each internal clock cycle in this way will suffer substantial performance penalties in terms of both bandwidth and latency. Moreover, only very simple scheduling algorithms with reduced scheduling features can be supported in such arrangements. It is within this context that the embodiments described herein arise.

BRIEF DESCRIPTION OF THE DRAWINGS

FIGS. 7A and 7B are diagrams showing illustrative minimum command phase interval requirements in accordance with an embodiment.

DETAILED DESCRIPTION

The present embodiments relate to methods and apparatus for implementing and partitioning a complex command scheduler that is capable of scheduling n winning commands from m input commands at each interface clock cycle into n individual orthogonal scheduling circuits. Each of the n orthogonal scheduling circuits will only schedule one winning command per interface clock cycle. Configured and operated in this way, the latency of the communications interface supported by the command scheduler may be substantially reduced by increasing the command bus bandwidth by n times while improving timing margins and reducing power consumption.

It will be recognized by one skilled in the art, that the present exemplary embodiments may be practiced without some or all of these specific details. In other instances, well-known operations have not been described in detail in order not to unnecessarily obscure the present embodiments.

Figure 1:
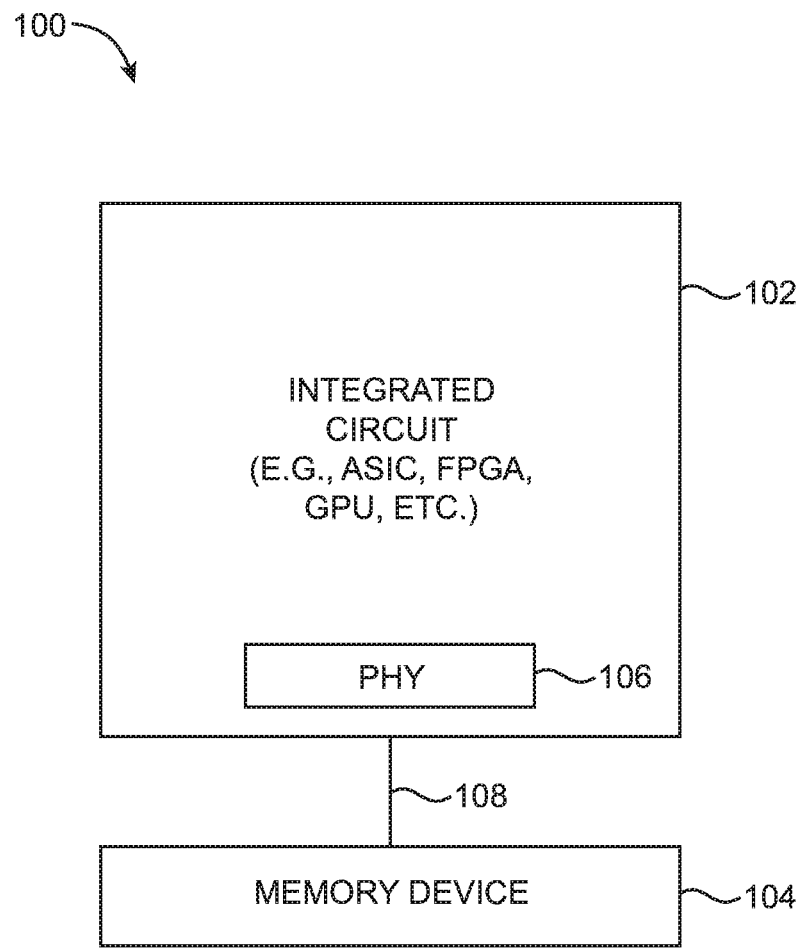
FIG. 1 is a diagram of an illustrative integrated circuit coupled to an external memory device in accordance with an embodiment.

FIG. 1 shows an illustrated integrated circuit system such as system 100. As shown in FIG. 1, system 100 may include a main integrated circuit die 102 that is coupled to one or more auxiliary components such as a memory device 104. Integrated circuit 102 may be a central processing unit (CPU), a graphics processing unit (GPU), an application-specific integrated circuit (ASIC), an application specific standard product (ASSP), a microcontroller, a microprocessor, a programmable integrated circuit, etc. Examples of programmable integrated circuits include programmable logic devices (PLDs), field programmable gate arrays (FPGAs), programmable arrays logic (PALs), programmable logic arrays (PLAs), field programmable logic arrays (FPGAs), electrically programmable logic devices (EPLDs), electrically erasable programmable logic devices (EEPLDs), logic cell arrays (LCAs), and complex programmable logic devices (CPLDs), just to name a few.

Device 102 may include transceivers and/or other input-output (I/O) components for interfacing with external devices. For example, device 102 may include physical-layer ("PHY") interface circuitry such as PHY circuits 106 configured to communicate with the auxiliary memory device 104 via interface 108. In one suitable arrangement, devices 102 and 104 may be mounted as separate discrete components on a circuit board, may be formed as part of a single package (e.g., a multichip package where auxiliary device 104 is mounted laterally with respect to main device 102 or where auxiliary device 104 is stacked vertically with respect to main device 102, etc.), may be formed as parts of different systems, etc.

PHY circuits 106 may serve as a physical-layer bridging interface between an associated memory controller on main device 102 and one or more high-bandwidth channels coupled to memory device 104 (e.g., PHY circuits 106 may be used to physically drive signals off of device 102 to memory device 104 and to receive signals from memory device 104). In general, PHY circuits 106 may be configured to support serial or parallel input-output channel interfaces running at single data rate (SDR), dual data rate (DDR), or quad data rate (QDR) communications schemes.

Memory device 104 may be a memory chip (e.g., one or more memory devices stacked on top of one another) that is implemented using random-access memory such as static random-access memory (SRAM), dynamic random-access memory (DRAM), low latency DRAM (LLDRAM), reduced latency DRAM (RLDRAM), or other types of volatile memory. If desired, memory device 104 may also be implemented using nonvolatile memory (e.g., fuse-based memory, antifuse-based memory, electrically-programmable read-only memory, etc.). In some embodiments, memory device 104 may be an off-chip memory device sometimes referred to as a single in-line memory module (SIMM) or a dual in-line memory module (DIMM). If desired, device 10 may be configured to communicate with at least two memory modules, at least four memory modules, etc.

Figure 2:
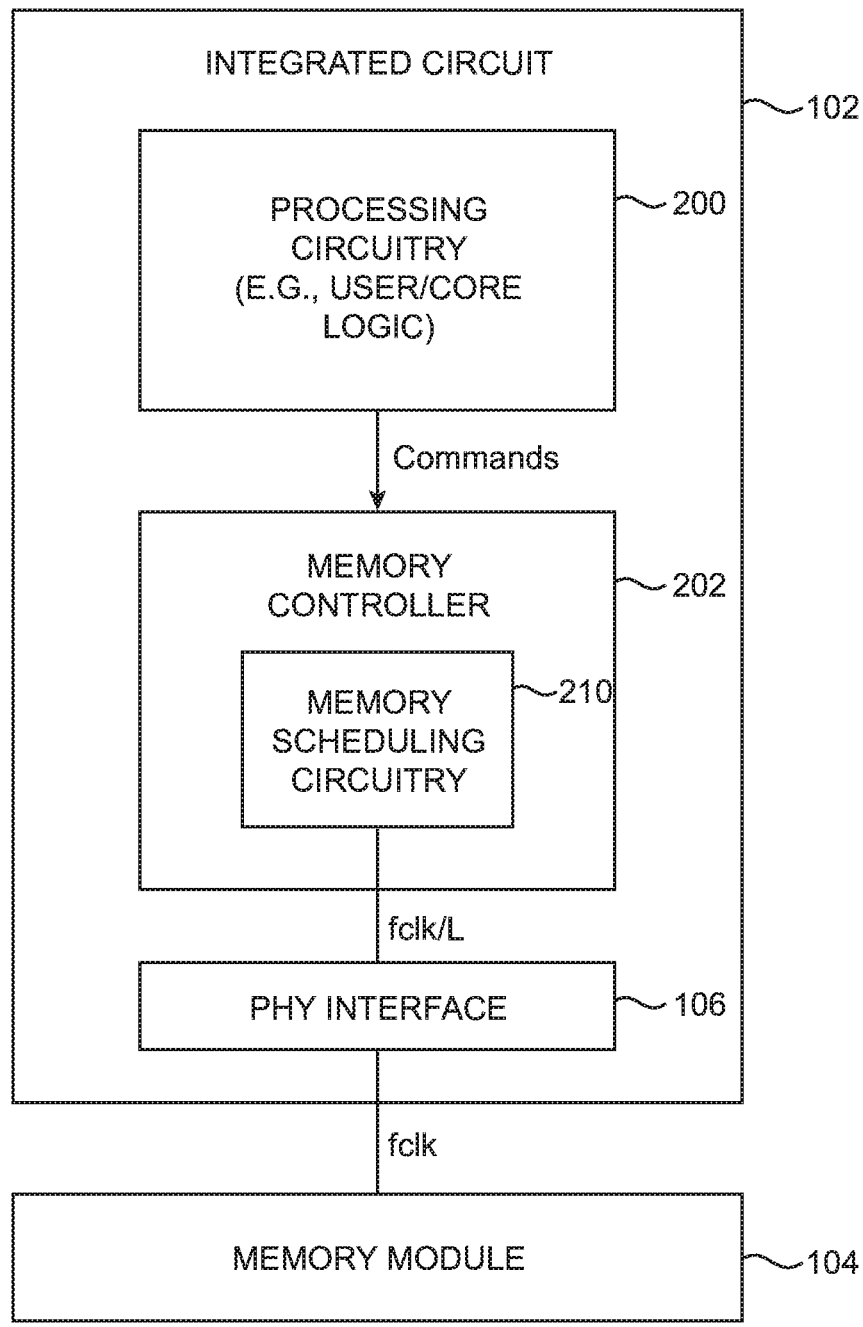
FIG. 2 is a diagram of an illustrative integrated circuit that includes a memory controller for communicating with an external memory module in accordance with an embodiment.

FIG. 2 is a diagram showing how integrated circuit 102 may include a memory controller for communicating with external memory module 104. As shown in FIG. 2, integrated circuit 102 may include processing circuitry 200 and memory controller 202 configured to relay information between processing circuitry 200 and the PHY interface 106. Processing circuitry 200 may include user logic, core logic circuits, embedded microprocessors, digital signal processors (DSP), microcontrollers, specialized processing blocks, arithmetic processing circuits, and/or other processing circuitry. If desired, memory controller 202 and/or PHY interface 106 may also include user logic, core logic circuits, embedded microprocessors, digital signal processors (DSP), microcontrollers, specialized processing blocks, arithmetic processing circuits, and/or other processing circuitry. Memory controller 202 and/or PHY interface 106 may optionally be implemented as a hardened block (e.g., a hardened intellectual property block) or using custom soft logic circuitry. Circuitry 200 may further include on-chip storage components such as random-access memory (RAM), first-in first-out (FIFO) circuitry, stack or last-in first-out (LIFO) circuitry, read-only memory (ROM), content-addressable memory (CAM), or other memory elements.

To initiate a memory operation, processing circuitry 200 may output one or more corresponding commands along with the associated clock, address, and/or other control signals to memory controller 202. Memory controller 202 may include command scheduling circuitry 210 for selecting which commands are being sent to the PHY interface at any given point in time. Still referring to FIG. 2, signals conveyed from the PHY interface to memory module 104 may be transmitted using an interface clock signal having an interface clock rate fclk. The command scheduling circuitry 202, however, may only be capable of operating using an internal clock signal having an internal clock rate that is only a fraction of fclk. For example, the internal clock rate may be equal to fclk/L, where L may be equal to two, four, six, eight, between two and eight, greater than eight, or any suitable integer value.

In order to reduce the complexity of the memory controller, conventional command scheduling circuitry only sends out one command at each internal clock cycle. Other traditional schedulers are capable of outputting multiple commands during each internal clock cycle, but the interface clock rate will be severely limited while such schedulers have complex implementations that require elimination of features such as the elimination of Quality-of-Service (QoS) feature to help keep the overall complexity at a manageable level. Either of these approaches suffers from substantial performance penalties in terms of bandwidth and latency. Moreover, the elimination of features such as QoS may be undesirable for many applications, whereas large complex implementations will have a difficult time meeting area and power consumption budgets.

Figure 3:
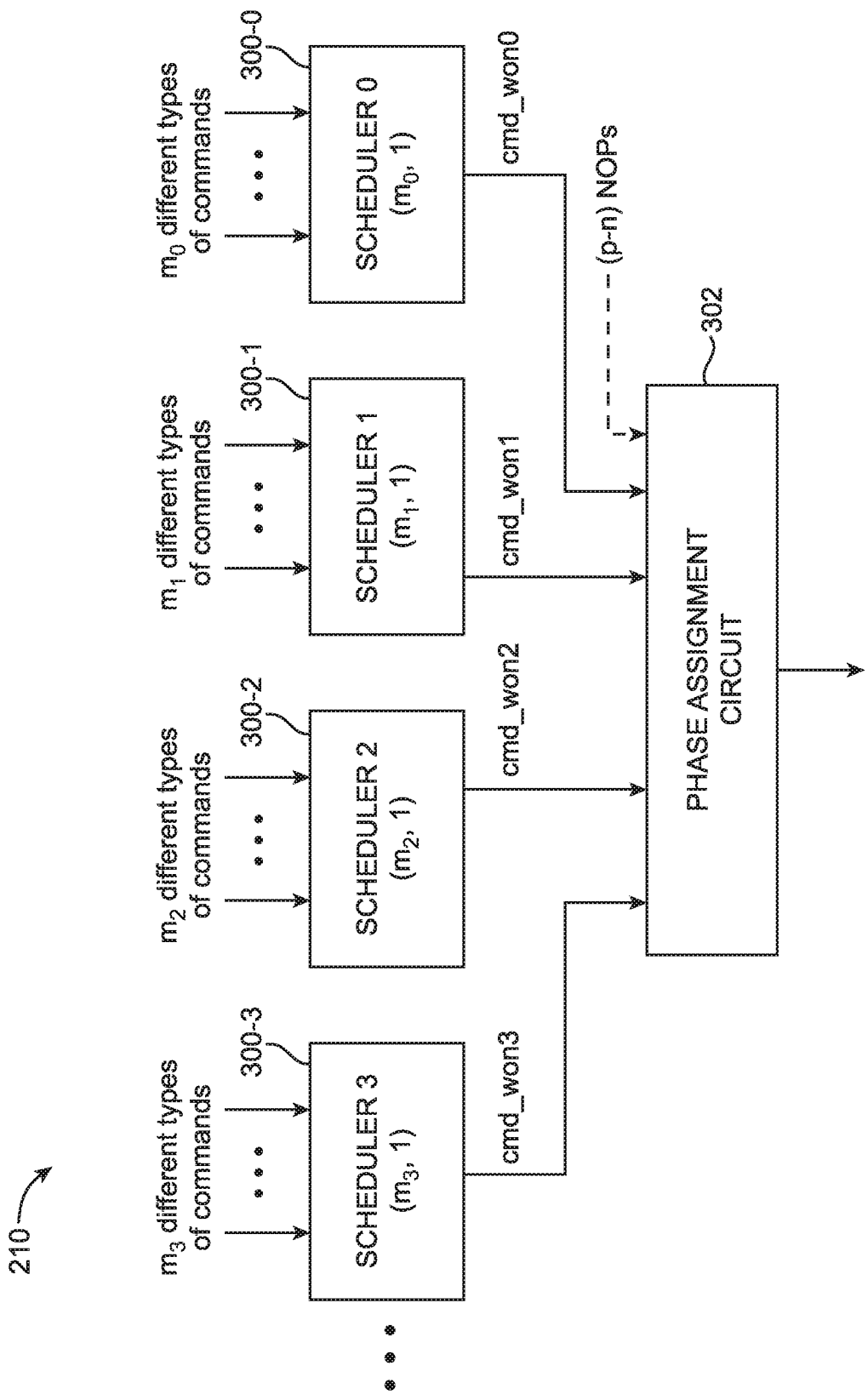
FIG. 3 is a diagram of illustrative orthogonal multi-phase scheduling circuitry in accordance with an embodiment.

In accordance with an embodiment, FIG. 3 is a diagram of illustrative command scheduling circuitry such as orthogonal multi-phase scheduling circuitry 210. As shown in FIG. 3, circuitry 210 may include "n" orthogonal scheduling circuits 300, each of which is configured to output one winning command per internal clock cycle. The term "orthogonal" means that each scheduling circuit 300 is associated with a different phase group such that no phase will intersect or overlap with one another (i.e., different phases are always orthogonal). The orthogonal scheduling circuits 300 may be independent or dependent from one another. In the example of FIG. 3, circuitry 210 may be provided with four orthogonal scheduling circuits 300-0, 300-1, 300-2, and 300-3 (e.g., n=4). This is merely illustrative. In general, multi-phase scheduling circuitry 210 may include at least two, two to four, four to eight, more than eight, or any suitable number of orthogonal scheduling circuits 300.

In this example, scheduling circuitry 210 may receive up to m_total commands of m_total different types of commands per internal clock cycle, where m_total is equal to (m0+m1+m2+m3). The first scheduling circuit 300-0 may receive up to m0 commands of m0 different types of commands and may output a single winning command cmd_won0. The second scheduling circuit 300-1 may receive up to m1 commands of m1 different types of commands and may output a single winning command cmd_won1. The third scheduling circuit 300-2 may receive up to m2 commands of m2 different types of commands and may output a single winning command cmd_won2. The fourth scheduling circuit 300-3 may receive up to m3 commands of m3 different types of commands and may output a single winning command cmd_won3. In other words, each of the four orthogonal scheduling circuits is configured to output a single winning command at any given point in time during normal operation. The cmd_woni can be null when there is no qualified input command for the scheduler i, for i=0, 1, 2, 3.

Figure 4A:
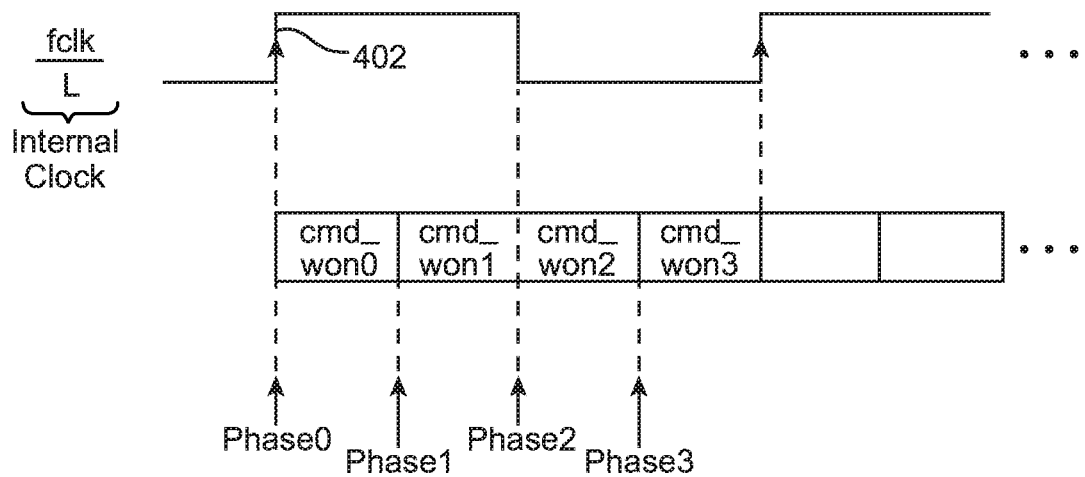
FIG. 4A is a timing diagram showing how multiple orthogonal winning commands may assigned to different phases in accordance with an embodiment.

Scheduling circuitry 210 may further include a phase assignment circuit such as phase assignment circuit 302 configured to allocate the various winning commands to different phases of the internal clock signal. Assuming circuitry 210 has four scheduling circuits 300, FIG. 4A shows how phase assignment circuit 302 may assign the winning command from the first scheduler cmd_won0 to a first phase position (e.g., a phase0 position that is aligned to the rising edge 402 of the internal clock signal), may assign the winning command from the second scheduler cmd_won1 to a second phase position (e.g., a phase1 position having a 90° phase offset relative to rising edge 402), may assign the winning command from the third scheduler cmd_won2 to a third phase position (e.g., a phase2 position having a 180° phase offset relative to rising edge 402), and may assign the winning command from the fourth scheduler cmd_won3 to a fourth phase position (e.g., a phase3 position having a 270° phase offset relative to rising edge 402). In other words, there are multiple commands that may be presented at the interface during each internal clock cycle. Each "phase" may be defined as a time slot or duration of the shortest command.

In this example, the maximum possible number of phases "p" in each internal clock cycle is p=4, where p is defined as being equal to L/K. As described above in connection with FIG. 2, parameter L defines the ratio of the interface clock to the internal clock and is typically a fixed number. On the other hand, parameter K is defined as the duration of a single command in terms of interface clock cycles and is typically a fixed number. Here, assume that L is equal to four (i.e., the internal clock is a quarter of the interface clock), and K is equal to one (i.e., the duration of one command is a single internal clock cycle); thus, the maximum number of phases p is equal to 4/1.

Figure 4B:
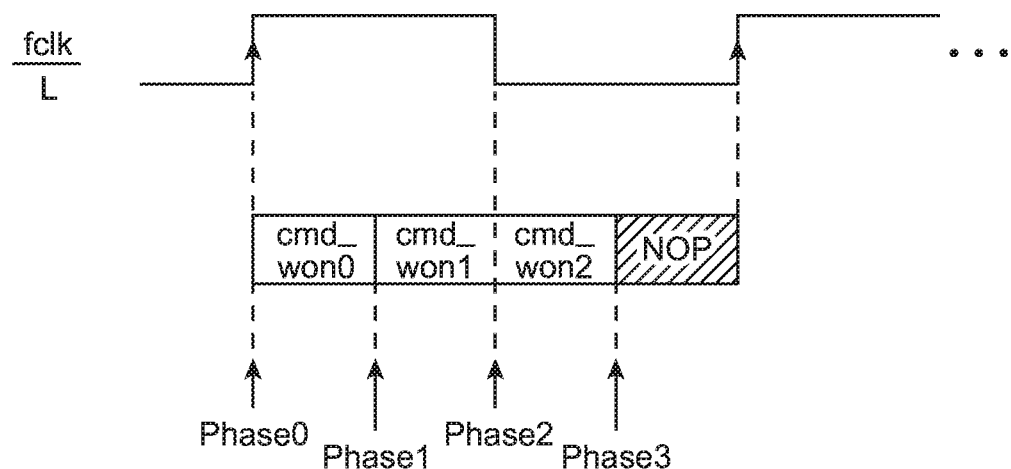
FIG. 4B is a timing diagram showing how multiple orthogonal winning commands and at least one no-operation may be interleaved in accordance with an embodiment.

In the example of FIG. 3, scheduling circuitry 210 includes n=4 individual scheduling circuits 300, where n in general can be any integer less than or equal to the maximum number of phases p defined above (i.e., n>=p). In other words, scheduling circuitry 210 is configured to schedule n winning commands every internal clock cycle, where n is an integer from 2 to p. If n is set equal to p, then it is possible for all phases to be assigned with a winning command as shown in the example of FIG. 4A. If n is set to be less than p, then at least some no-operations ("no-ops" or "NOPs") may be interleaved with the winning commands such as at least one phase is occupied with a NOP (see, e.g., FIG. 4B). In the example of FIG. 4B, scheduling circuitry 210 may include only n=3 scheduling circuits 300 when p=4, so at least one of the four phases is assigned a NOP (see phase3).

Configured in this way, scheduling circuitry 210 is able to schedule n commands from m_total input commands of m_total different types of commands received at every internal clock cycle, where the m_total input commands are sorted into p orthogonal phase groups. The n scheduling circuits 300, each of which is associated with a different phase group, may operate in parallel to output the n winning commands. The n winning commands are then scheduled at different phases using the phase assignment circuit 302, which optionally interleave in one or more NOPs whenever n is less than p. The number of interleaved NOPs may be equal to (p−n). By partitioning a m_total:n scheduling circuitry 210 into n smaller scheduling circuits 300, the complexity of the overall scheduling circuitry is dramatically reduced from O(m_total*n) to O(m_total/n) on average, which substantially reduces circuit area, cost, and power consumption.

As described above, the p phase groups are orthogonal to each other. The term "orthogonal" means that one particular type of command can only occur in a particular phase. Referring back to the example of FIG. 3, assume that m0, m1, m2, and m3 are all each equal to four such that m_total is equal to 16. Scheduler 300-0 may be associated with the phase0 group; scheduler 300-1 may be associated with the phase1 group; scheduler 300-2 may be associated with the phase2 group; and scheduler 300-3 may be associated with the phase3 group (as shown in the example of FIG. 4A). In this example, there may be 16 different types of commands that are received at the input of scheduling circuitry 210. Examples of different types of commands may include a simple read command, a simple write command, an activate command, a precharge command, a termination command, a calibration command, a mode register read command, a mode register write command, a multi-purpose command, a write pattern command, a self-refresh command, a power done entry command, a power down exit command, a deselect command, etc. Thus, a read command should only be fed to a selected scheduler such as scheduler 300-0, so that any read command can only occur at phase0. Similarly, if a precharge command is only received at scheduler 300-2, then a precharge command can only occur at phase2. In other words, the commands in different phases are orthogonal (i.e., commands in different command phase groups are never in a same phase or intersecting each other).

Generally, the orthogonal multi-phase scheduling circuitry 210 may be characterized by the following conditions: (1) a multiple phase condition; and (2) an orthogonal phase condition. The first multi-phase condition requires more than one command to be issued in L consecutive interface clock cycles. In other words, L consecutive interface clock cycles may correspond to p orthogonal phase groups during which different types of commands can occur.

The second orthogonal phase condition requires that the number of interface clock cycles between any pair of the same command type be a multiple of L. Thus, in an example where p=L=4, a write command should only occur in a selected phase, and consecutive write commands should be separated by 4 interface clock cycles, 8 interface clock cycles, 12 interface clock cycles, or other multiples of four. In other words, each command type should only occur in a respective fixed phase group (i.e., a write command occurring in the phase0 group should not later on occur in another phase group). Moreover, any two commands in different phase groups should also be orthogonal.

Exemplary device configurations where orthogonal multi-phase scheduling circuitry 210 includes n=4 orthogonal scheduling circuits (each of which receives four different command types) feeding n winning commands into p=4 orthogonal phase groups is merely illustrative and is not intended to limit the scope of the present embodiments. In general, circuitry 210 may be configured to receive any number of inputs (e.g., m_total may be any integer greater than two, greater than eight, greater than 16, greater than 32, etc.) and may include any number of orthogonal scheduling circuits 300 (e.g., n may be any integer greater than one and less than or equal to the maximum possible number of phase groups p). If desired, each scheduling circuit 300 may receive the same number of commands (e.g., m0=m1=m2=m3) or may receive a different number of commands (e.g., m≠m1).

Figure 5:
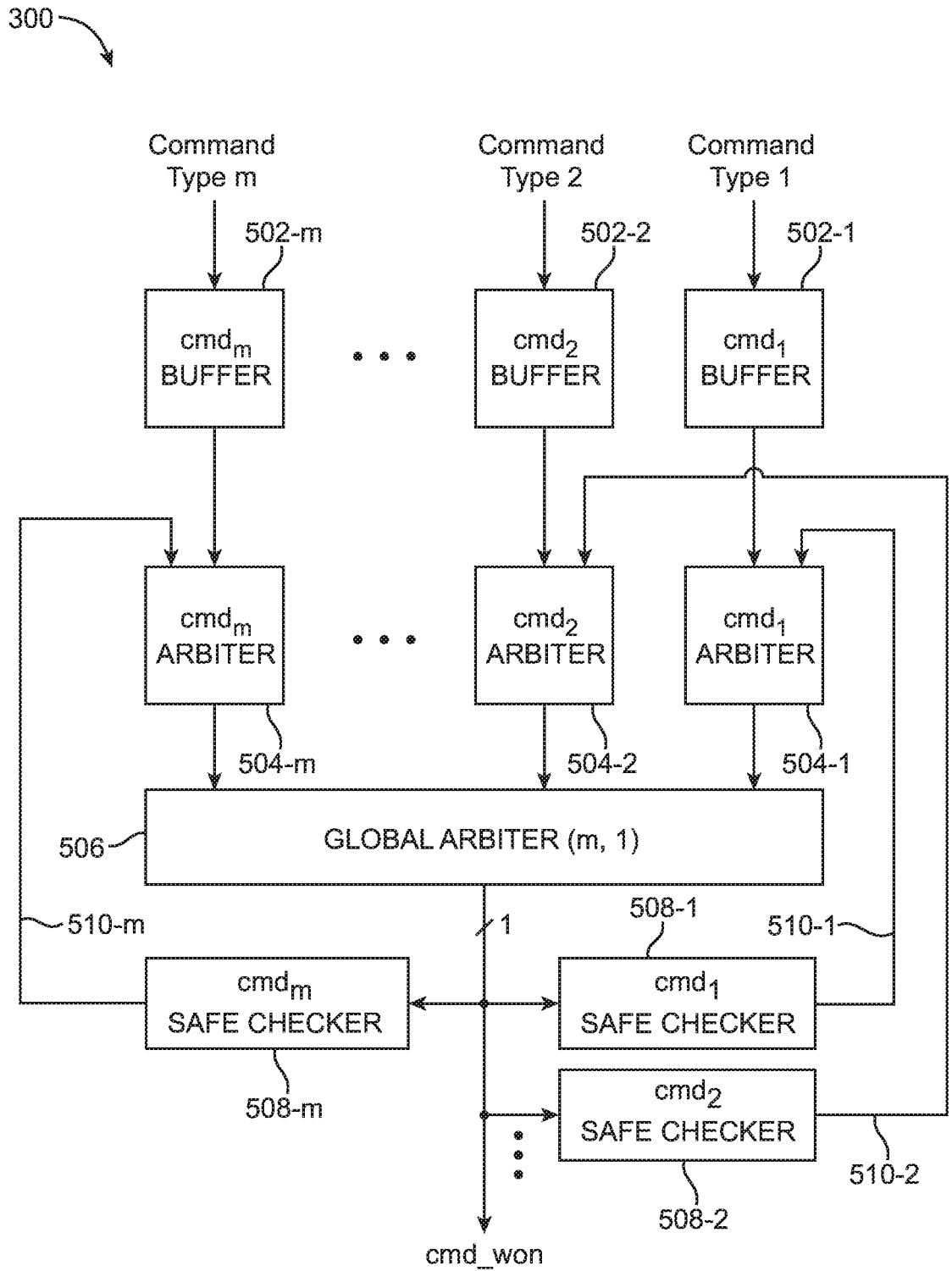
FIG. 5 is a diagram of an individual scheduling circuit configured to output a single winning command in accordance with an embodiment.

FIG. 5 is a diagram illustrating one suitable implementation of an individual scheduling circuit 300 configured to output a single winning command. As shown in FIG. 5, scheduling circuit 300 may have m input ports configured to receive m different types of commands, m command buffers 502 (sometimes referred to as command queues), m command arbiters 504, a global arbiter 506, and m safe checker circuits 508.

The first command buffer 502-1 may be configured to receive and queue commands of a first type; the second command buffer 502-2 may receive and queue commands of a second type; . . . ; and the mth command buffer 502-*m* may receive and queue commands of an mth type. Each command buffer may feed a respective command arbiter (e.g., command buffer 502-1 may feed command arbiter 504-1; command buffer 502-2 may feed command arbiter 504-2; . . . ; and command buffer 502-*m* may feed command arbiter 504-*m*). Configured in this way, each command arbiter 504 may select one winning command from the corresponding queue of commands in the preceding buffer. Each command arbiter 504-1, 504-2, and 504-*m* may optionally qualify the commands based on safe flags 510-1, 510-2, and 510-*m* generated from the corresponding safe checker circuits 508-1, 508-2, and 508-*m*, respectively, and arbitrating between the qualified commands using a round robin scheme, a first-come first-out scheme, or other priority schemes.

Global arbiter circuit 506 may receive m commands from the m command arbiters 504 and may select one winning command cmd_won for output by scheduling circuit 300. The command safe checking circuits 508 may monitor the output command cmd_won. Safe checker 508 may check if a particular output command can be scheduled safely based on a minimum command phase interval between all previous commands and the particular output command and/or credit. One command safe checker is required for each command (e.g., safe checker 508-1 is used for checking the commands from arbiter 504-1; safe checker 508-2 is used for checking the commands from arbiter 504-2; . . . ; and safe checker 508-m is used for checking the commands from arbiter 504-m). For example, if the minimum interval from cmd0 to cmd1 is equal to 5, the safe checker for cmd1 may deassert the safe flag to zero to block cmd1 in the next four phases (i.e., 5-1) whenever cmd0 is sent. In this case, the safe checker for cmd1 will need to monitor cmd0 all the time.

Figure 6:
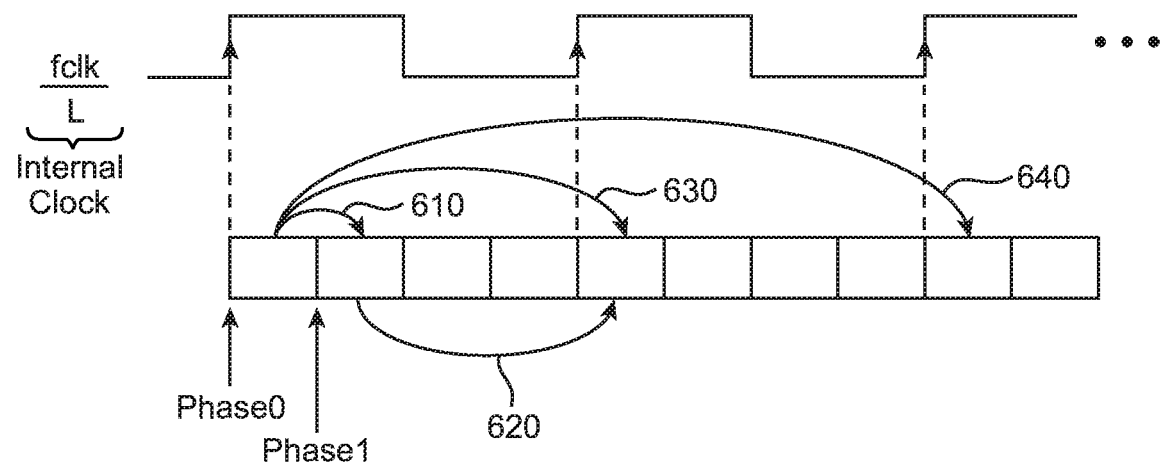
FIG. 6 is a timing diagram illustrating different phase intervals in accordance with an embodiment.

FIG. 6 is a diagram illustrating the concept and definition of "phase intervals." In the example of FIG. 6, the internal clock may be divided into four phases (p=4). In this scenario, the phase interval from the first phase0 to the first phase1 is equal to one (as shown by arrow 610). The phase interval from the first phase0 to the second/next phase0 is equal to four (as shown by arrow 630). The phase interval from the first phase0 to the third phase0 is equal to eight (as shown by arrow 640). In other words, the phase interval between same phase groups should be in multiples of p. As another example, the phase interval from the first phase1 to the second phase0 is equal to three (as shown by arrow 620). In general, phase intervals between different phase groups may be equal to one to p, greater than p, or multiples of p. Phase intervals may sometimes be referred to as time intervals.

Given a set of possible commands, there may be minimum command interval requirements between each pair of command types (e.g., minimum command phase interval requires set by the communications protocol of interest). For example, consider a scenario with a given set of different types of command (e.g., cmd0, cmd1, cmd2, cmd3, and cmd4). FIG. 7A is a table 700 showing the required minimum command interval between each possible command pair. As shown in rows 701 of FIG. 7A, the minimum required command interval between a first cmd0 and a second cmd0 is 4; the minimum required command interval between a first cmd0 and a first cmd1 is 3; the minimum required command interval between a first cmd0 and a first cmd2 is 1; the minimum required command interval between a first cmd0 and a first cmd3 is 2; and the minimum required command interval between a first cmd0 and a first cmd4 is 1. Table 700 lists all 25 possible command interval requirements for the five command types.

Once the minimum command intervals are known, the commands may be grouped into the p possible phases in various ways to achieve different goals and tradeoffs. Consider a scenario where p=4. The five command types may assigned as follows:

Phase0 command group: assigned with cmd0
Phase1 command group: assigned with cmd2 and cmd4
Phase2 command group: assigned with cmd3
Phase3 command group: assigned with cmd1

Given the above command-phase grouping, it is possible to verify that each and every adjacent command pair (i.e., $cmd_i$ to the $1^{st}$ next $cmd_j$) will be equal to or larger than the corresponding minimum required command interface as listed in table 700. For example, if cmd0 is in phase0 and cmd4 is in phase1, then the phase interval between the two will be equal to one, which is at least equal to the corresponding value in table 700 (see arrow 610 in FIG. 6 and entry 702 in FIG. 7A). Conversely, since cmd4 is in phase1 and cmd0 is in phase0, the phase interval between the cmd4 and cmd0 be equal to three, which is greater than the correspond value in table 700 (see arrow 620 in FIG. 6 and entry 704 in FIG. 7A). In this scenario, since all minimum command interval requirements are met by the selected phase grouping, safe checking is required only for commands in the same command phase group, and no safe checking is required for commands in different command phase groups. Hence, the four command schedulers are independent.

Because any given command type can only occur in its assigned phase, the actual implemented minimum command interval from $cmd_i$ to $cmd_j$ can be larger than the theoretical required minimum interval from $cmd_i$ to $cmd_j$. For example, the listed minimum required interval from cmd4 to cmd1 is 1 (see table entry 705), but the actual minimum command interval from cmd4 to cmd1 in the implemented circuit might be equal to 2. As another example, the listed minimum required interval from cmd2 to cmd2 is 6 (see table entry 706), but the actual minimum command interval from cmd2 to cmd2 in the implemented circuit might be equal to 8. Such possibility should be taken into consideration when design the multi-phase scheduling circuitry and when assigning commands to the different available phase groups.

Consider another example still with five different types of command (e.g., cmd0, cmd1, cmd2, cmd3, and cmd4). The minimum command interval requirements are the same as those in FIG. 7A except for cmd4, which are shown in FIG. 7B. Assuming the five commands are still grouped as follows:

Phase0 command group: assigned with cmd0
Phase1 command group: assigned with cmd2 and cmd4
Phase2 command group: assigned with cmd3
Phase3 Command Group: Assigned with cmd1

Given the above command-phase grouping (which is the same group as the previous example), the actual phase intervals for at least some command pairs will violate the corresponding minimum required command interface as listed in FIG. 7B (i.e., the actual phase intervals will be less than the required command phase interval). For example, the actual phase interval from cmd4 to the first next cmd0 is three (since cmd4 is in phase1 and cmd0 is in phase0), but the minimum required command interval for this pair is now 6 (see table entry 707). As another example, the actual phase interval from cmd4 to the first next cmd1 is two (since cmd4 is in phase1 and cmd1 is in phase3), but the minimum required command interval for this pair is now 5 (see entry table 708).

In such scenario where at least some of the minimum command interval requirements are violated, safe checking is required from cmd4 to cmd0, from cmd4 to cmd1, from cmd4 to cmd2, and from cmd4 to cmd3 (which are all in different command groups), and also from cmd4 to cmd4 (which are in the same command group). In this example, the four command phase groups and the four individual scheduling circuits 300 (see FIG. 3) are not independent (i.e., the n scheduling circuits are dependent on one another). The scheduling circuit 300-1 associated with phase1 will inform the schedulers for the other phase command groups whenever cmd4 is scheduled so that the other schedulers do not schedule any commands before meeting the minimum required command interval as specified in FIG. 7B.

Because any given command type can only occur in its assigned phase, the actual implemented minimum command interval from $cmd_i$ to $cmd_j$ might be larger than the theoretical required minimum interval from $cmd_i$ to $cmd_j$. For example, the listed minimum required interval from cmd4 to cmd0 is 6 (see table entry 707), but the actual minimum command interval from cmd4 to cmd0 in the implemented circuit might be equal to 7. Because cmd4 is assigned to phase1 while cmd0 is in phase0, the phase interval from phase1 to phase0 must be 3, 7, 11, 15, and so on. Thus, in order to meet the implemented minimum phase interval requirement, only 7, 11, 15, or higher intervals are viable assignments.

Figure 8:
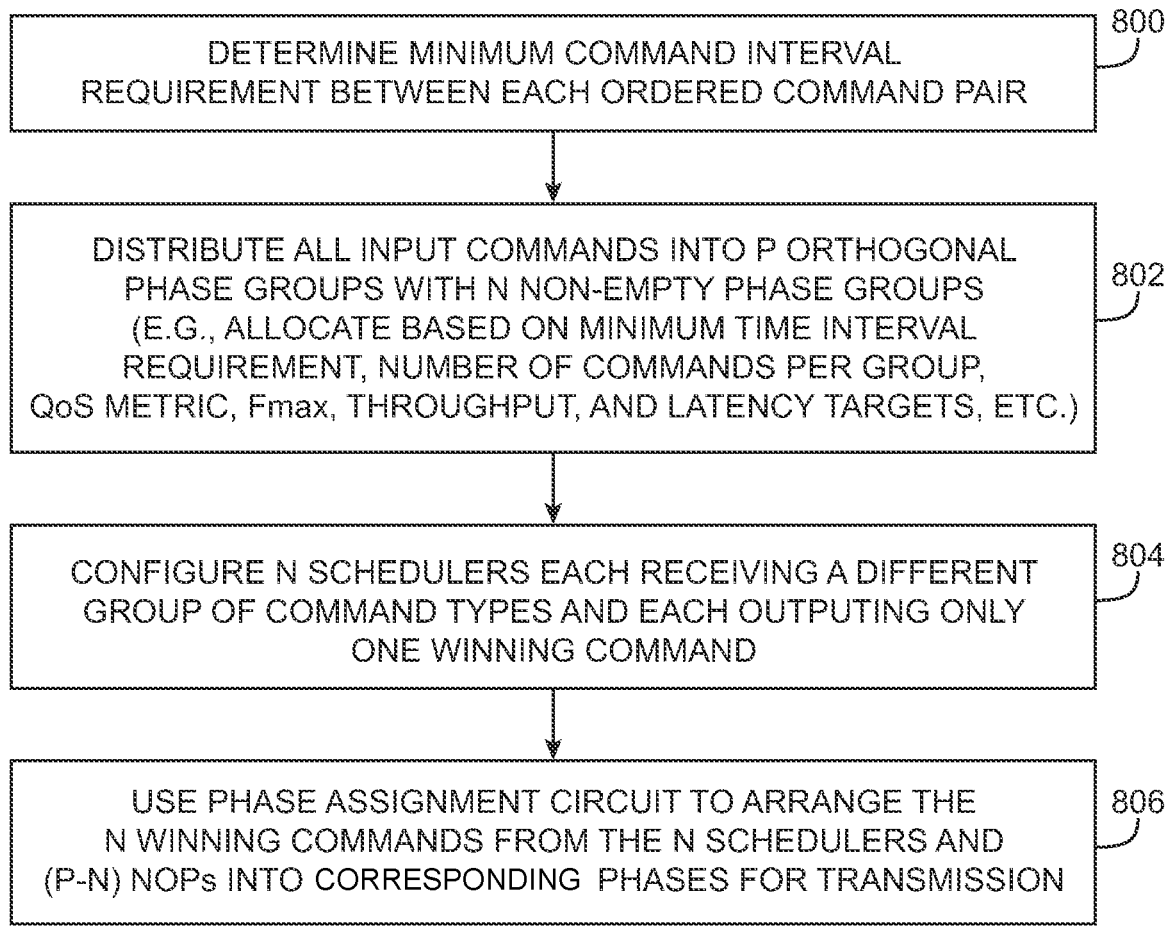
FIG. 8 is a flow chart of illustrative steps for configuring orthogonal multi-phase scheduling circuitry in accordance with an embodiment.

FIG. 8 is a flow chart of illustrative steps for configuring orthogonal multi-phase scheduling circuitry 210. At step 800, the minimum command interval requirements for each ordered command pair may be determined. In other words, the values in a table such as table 700 of FIG. 7A might be identified.

At step 802, the possible input commands may be distributed or assigned to p orthogonal phase groups with n non-empty phase groups. For example, the commands may be allocated to corresponding phases based on the minimum time interval requirements obtained from step 800, the number of commands in each command phase group, a Quality of Service (QoS) metric, the maximum operating frequency Fmax, the target throughput, the target latency, etc. In general, it may be desirable to distribute the m_total commands over the multiple orthogonal phase groups to maximize n (such that n is as close to p as possible) while balancing the number of command types received at the various schedulers (e.g., to minimize the largest of all $m_i$ for i=1, 2, ..., p. In other words, the number of command types received at each individual scheduling circuit 300 may be equal or may be slightly different.

If desired, the command types may be grouped to minimize the difference of the actual minimal command interval and the required command interval. If desired, the command types may be grouped such that the p phase groups should be independent so that there is no safe concern among any two commands from any two phase groups (i.e., any command in phase group i to any command in phase group j has a phase/time interval between phase i and phase j larger than the minimum required command interval between the two commands). Some of the phase groups may be empty. If the number of non-empty phase groups is n, where n is less than p, then there will be (p−n) empty phase groups.

At step 804, the n individual scheduling circuits may be configured to receive a different group of command types and may each output one winning command. Because the n non-empty phase groups are orthogonal to one another, the n scheduling circuits are designed independently except for some safe checkers across the schedulers in some cases and only one winning command has to be scheduled from each, which dramatically reduces the complexity of the overall scheduling circuitry.

At step 806, the phase assignment circuit may be configured to arrange the n winning commands output in parallel from the n orthogonal scheduling circuits. If n<p, then (p−n) no-operations may be sent during the empty phases over the interface.

Although the methods of operations are described in a specific order, it should be understood that other operations may be performed in between described operations, described operations may be adjusted so that they occur at slightly different times or described operations may be distributed in a system which allows occurrence of the processing operations at various intervals associated with the processing, as long as the processing of the overlay operations are performed in a desired way.

Figure 9:
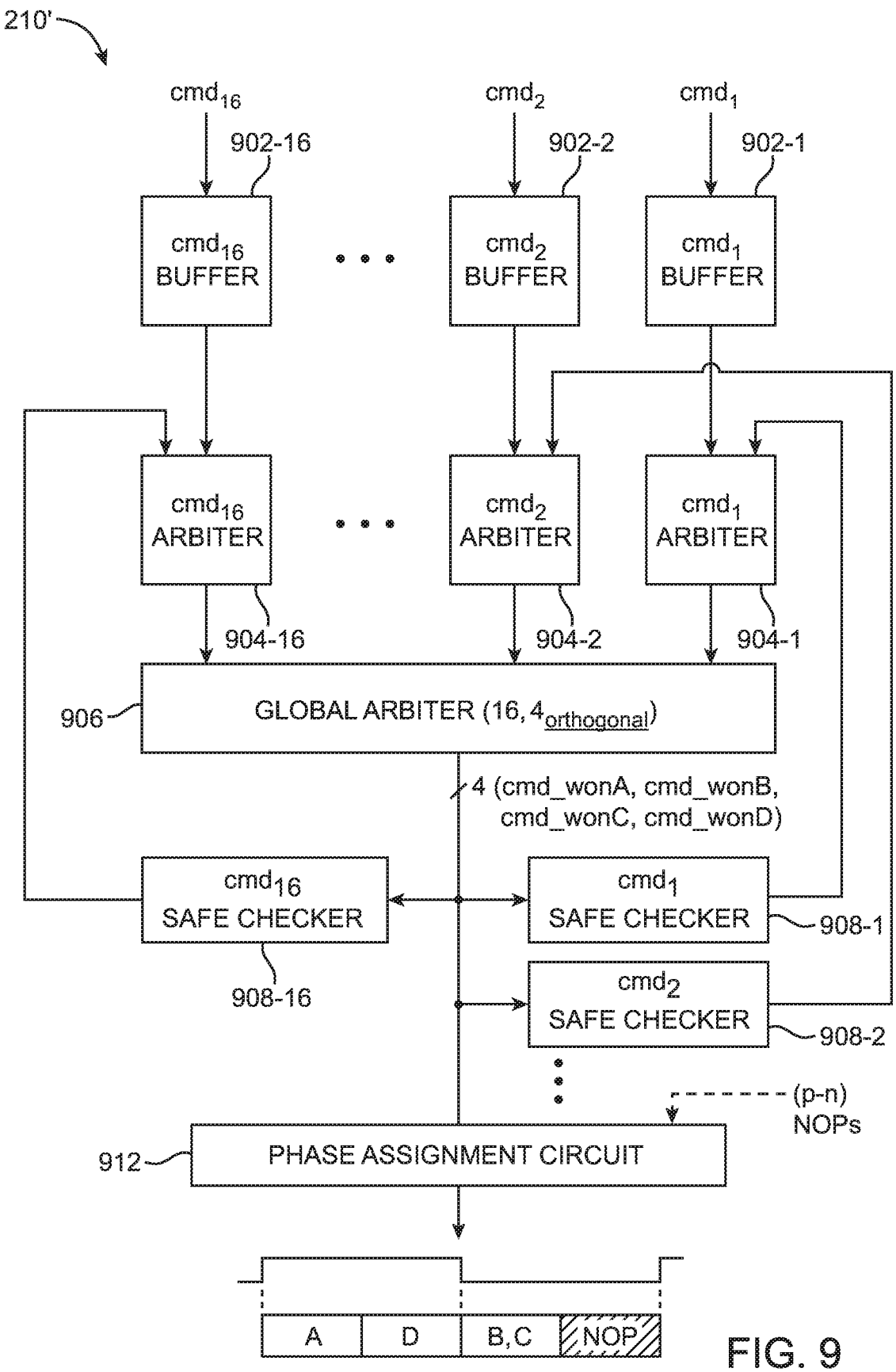
FIG. 9 is a diagram of an illustrative single-scheduler multi-phase scheduling circuitry in accordance with an embodiment.

The embodiments described above that involve use of n orthogonal scheduling circuits are merely illustrative and are not intended to limit the scope of the present embodiments. If desired, orthogonal multi-phase scheduling circuitry may be implemented as a single scheduling circuit that satisfies the multiple phase condition (e.g., multiple commands are issued during different phases of the internal clock signal) and the orthogonal phase condition (e.g., particular command types will only occur in assigned orthogonal phase groups). An exemplary implementation of such single-scheduler orthogonal multi-phase scheduling circuitry 210' is shown in FIG. 9. As shown in FIG. 9, scheduling circuitry 210' may have m_total=16 input ports configured to receive 16 different types of commands, 16 command buffers 902 (e.g., command queues), 16 command arbiters 904, a global arbiter 906, 16 safe checking circuits 908, and a phase alignment circuit 912.

The first command buffer 902-1 may be configured to receive and queue commands of a first type; the second command buffer 902-2 may receive and queue commands of a second type; ...; and the 16$^{th}$ command buffer 902-16 may receive and queue commands of a 16$^{th}$ type. Each command queue 902 may feed a respective command arbiter (e.g., command buffer 902-1 may feed command arbiter 904-1; command buffer 902-2 may feed command arbiter 904-2; ...; and command buffer 902-16 may feed command arbiter 904-16). Configured in this way, each command arbiter 904 may select one winning command from the corresponding queue of commands in the preceding buffer. Each command arbiter 904 may optionally qualify the commands based on safe flags generated from the corresponding safe checker circuits 908 and arbitrating between the qualified commands using a round robin scheme, a first-come first-out scheme, or other priority schemes.

Global arbiter circuit 906 may receive the 16 commands from the 16 command arbiters 904 and may select a group of four orthogonal winning commands (e.g., cmd_wonA, cmd_wonB, cmd_wonC, cmd_wonD) for output. The command safe checking circuits 908 may monitor the four output winning commands. Safe checker 908 may check if a particular output command can be scheduled safely based on a minimum command phase interval between all previous commands and the particular output command and/or credit. One command safe checker is required for each command type (e.g., safe checker 908-1 is used for checking the commands from arbiter 904-1; safe checker 908-2 is used for checking the commands from arbiter 904-2; ...; and safe checker 908-16 is used for checking the commands from arbiter 904-16).

Phase assignment circuit 912 may be configured to allocate the four winning commands to the different phases of the internal clock signal. Assuming p=4, phase assignment circuit 912 will assign the four winning commands to the four available phase groups according to the command types of winning commands or the phase schedulers of the winning commands. In the example of FIG. 9, cmd_wonA may be assigned to the first phase command group; cmd_wonD may be assigned to the second phase command group; cmd_wonB and cmd_wonC may be assigned to the third phase command group; so the fourth phase command group may be empty. In this scenario, a NOP command may be interleaved with the other commands so that the one NOP occurs at the fourth phase group.

The example of FIG. 9 in which multi-phase scheduling circuitry 210' has 16 inputs and 4 possible phase groups is merely illustrative. In general, the single-scheduler implementation of the type shown in FIG. 9 may be configured to support any suitable number of different command types, and any desired number of phase groups.

EXAMPLES

The following examples pertain to further embodiments.

Example 1 is an integrated circuit, comprising: an interface circuit configured to communicate with an external device; and multi-phase scheduling circuitry controlled by an internal clock signal, wherein the multi-phase scheduling circuitry is configured to output a first command during a first phase of the internal clock signal and to output a second command during a second phase of the internal clock signal that is different than the first phase.

Example 2 is the integrated circuit of example 1, wherein the multi-phase scheduling circuitry is optionally further configured to receive commands of a first type and to output the commands of the first type only during the first phase of the internal clock signal.

Example 3 is the integrated circuit of example 2, wherein the multi-phase scheduling circuitry is optionally further configured to receive commands of a second type and to output the commands of the second type only during the second phase of the internal clock signal.

Example 4 is the integrated circuit of any one of examples 1-3, wherein the multi-phase scheduling circuitry optionally comprises a plurality of orthogonal scheduling circuits.

Example 5 is the integrated circuit of any one of examples 1-3, wherein the multi-phase scheduling circuitry optionally comprises a plurality of scheduling circuits.

Example 6 is the integrated circuit of example 5, wherein each scheduling circuit in the plurality of scheduling circuits is optionally configured to receive commands of different types.

Example 7 is the integrated circuit of any one of examples 5-6, wherein each scheduling circuit in the plurality of scheduling circuits is optionally configured to output a single winning command at any given point in time.

Example 8 is the integrated circuit of any one of examples 5-7, wherein the multi-phase scheduling circuitry optionally further comprises: a phase assignment circuit configured to assign the first command to the first phase of the internal clock signal and to assign the second command to the second phase of the internal clock signal.

Example 9 is the integrated circuit of example 8, wherein the phase assignment circuit is optionally further configured to assign at least one no-operation (NOP) to at least one empty phase of the internal clock signal.

Example 10 is the integrated circuit of any one of examples 5-9, wherein at least one scheduling circuit in the plurality of scheduling circuits optionally comprises: a plurality of command queues configured to receive and buffer input commands of different types.

Example 11 is the integrated circuit of example 10, wherein the at least one scheduling circuit in the plurality of scheduling circuits optionally further comprises: a plurality of command arbiters configured to receive commands from the plurality of command queues.

Example 12 is the integrated circuit of example 11, wherein the at least one scheduling circuit in the plurality of scheduling circuits optionally further comprises: a global arbiter configured to receive commands from the plurality of command arbiters and to output a single winning command from among the commands received from the plurality of command arbiters.

Example 13 is the integrated circuit of example 12, wherein the at least one scheduling circuit in the plurality of scheduling circuits optionally further comprises: a plurality of safe checking circuits configured to monitor the single winning command output from the global arbiter and to check whether the single winning command can be safely scheduled based on minimum command interval requirements between previous commands and the single winning command.

Example 14 is an integrated circuit, comprising: an interface circuit operable to communicate with an off-chip device; and command scheduling circuitry controlled by an internal clock signal, wherein the command scheduling circuitry is configured to output at least a first type of command and a second type of command, and wherein the command scheduling circuitry is further configured to output the first type of command only during a first phase of the internal clock signal and to output the second type of command only during a second phase of the internal clock signal that is different than the first phase.

Example 15 is the integrated circuit of example 14, wherein the command scheduling circuitry is optionally further configured to output at least four different types of commands during at least four different phases of the internal clock signal.

Example 16 is the integrated circuit of any one of examples 14-15, wherein the command scheduling circuitry optionally comprises a plurality of scheduling circuits each of which is configured to receive commands of different types and to output a single winning command.

Example 17 is the integrated circuit of example 16, wherein the plurality of scheduling circuits optionally comprises a plurality of independent scheduling circuits such that no safe checking is required between commands in different phases of the internal clock signal.

Example 18 is the integrated circuit of example 16, wherein the plurality of scheduling circuits optionally comprises a plurality of dependent scheduling circuits such that safe checking is required between commands in different phases of the internal clock signal.

Example 19 is command scheduling circuitry, comprising: a plurality of command queues configured to receive different types of commands; a plurality of command arbiters configured to receive commands from the plurality of command queues; a global arbiter configured to receive commands from the plurality of command arbiters and to output orthogonal commands; and a phase assignment circuit configured to receive the orthogonal commands from the global arbiter and to assign the orthogonal commands to respective phase groups of a clock signal.

Example 20 is the command scheduling circuitry of example 19, optionally further comprising: a plurality of safe checking circuits interposed in feedback paths coupled between the global arbiter and the plurality of command arbiters.

For instance, all optional features of the apparatus described above may also be implemented with respect to the method or process described herein. The foregoing is merely illustrative of the principles of this disclosure and various modifications can be made by those skilled in the art. The foregoing embodiments may be implemented individually or in any combination.

What is claimed is:
1. A method comprising:
using an interface circuit in an integrated circuit to communicate with a device external to the integrated circuit;
outputting a first type of command from command scheduling circuitry in the integrated circuit only during a first phase of each clock cycle of an internal clock signal, wherein the command scheduling circuitry is controlled by the internal clock signal;

outputting a second type of command from the command scheduling circuitry only during a second phase of each clock cycle of the internal clock signal that is different than the first phase; and outputting a third type of command from the command scheduling circuitry only during a third phase of each clock cycle of the internal clock signal that is different than the first phase and the second phase.

2. The method of claim 1 further comprising:

outputting a fourth type of command from the command scheduling circuitry only during a fourth phase of each clock cycle of the internal clock signal that is different than the first phase, the second phase, and the third phase.

3. An integrated circuit, comprising:

an interface circuit operable to communicate with a device external to the integrated circuit; and command scheduling circuitry controlled by an internal clock signal, wherein the command scheduling circuitry is configured to output at least a first type of command, a second type of command, and a third type of command, and wherein the command scheduling circuitry is further configured to output the first type of command only during a first phase of each clock cycle of the internal clock signal, to output the second type of command only during a second phase of each clock cycle of the internal clock signal that is different than the first phase, and to output the third type of command only during a third phase of each clock cycle of the internal clock signal that is different than the first phase and the second phase.

4. The integrated circuit of claim 3, wherein the command scheduling circuitry is further configured to output at least four different types of commands during at least four different phases of each clock cycle of the internal clock signal.

5. The integrated circuit of claim 3, wherein the command scheduling circuitry comprises a plurality of scheduling circuits each of which is configured to receive commands of different types and to output a single winning command.

6. The integrated circuit of claim 3, wherein the command scheduling circuitry comprises a plurality of independent scheduling circuits such that no safe checking is required between commands in different phases of the internal clock signal.

7. The integrated circuit of claim 3, wherein the command scheduling circuitry comprises a plurality of dependent scheduling circuits such that safe checking is required between commands in different phases of the internal clock signal.

8. An integrated circuit, comprising:

an interface circuit configured to communicate with an external device; and multi-phase scheduling circuitry controlled by an internal clock signal, wherein the multi-phase scheduling circuitry is configured to output a first type of command only during a first phase of each clock cycle of the internal clock signal, to output a second type of command only during a second phase of each clock cycle of the internal clock signal that is different than the first phase, and to output a third type of command only during a third phase of each clock cycle of the internal clock signal that is different than the first phase and the second phase.

9. The integrated circuit of claim 8, wherein the multi-phase scheduling circuitry is further configured to receive commands of the first type and to output the commands of the first type only during the first phase of each clock cycle of the internal clock signal.

10. The integrated circuit of claim 9, wherein the multi-phase scheduling circuitry is further configured to receive commands of the second type and to output the commands of the second type only during the second phase of each clock cycle of the internal clock signal.

11. The integrated circuit of claim 8, wherein the multi-phase scheduling circuitry outputs a fourth type of command only during a fourth phase of each clock cycle of the internal clock signal that is different than the first phase, the second phase, and the third phase.

12. The integrated circuit of claim 8, wherein the multi-phase scheduling circuitry comprises a plurality of scheduling circuits.

13. The integrated circuit of claim 12, wherein each scheduling circuit in the plurality of scheduling circuits is configured to receive commands of different types.

14. The integrated circuit of claim 12, wherein each scheduling circuit in the plurality of scheduling circuits is configured to output a single winning command at any given point in time.

15. The integrated circuit of claim 12, wherein the multi-phase scheduling circuitry further comprises:

a phase assignment circuit configured to assign the first type of command to the first phase of each clock cycle of the internal clock signal and to assign the second type of command to the second phase of each clock cycle of the internal clock signal.

16. The integrated circuit of claim 15, wherein the phase assignment circuit is further configured to assign at least one no-operation (NOP) to at least one empty phase of the internal clock signal.

17. The integrated circuit of claim 12, wherein at least one scheduling circuit in the plurality of scheduling circuits comprises:

a plurality of command queues configured to receive and buffer input commands of different types.

18. The integrated circuit of claim 17, wherein the at least one scheduling circuit in the plurality of scheduling circuits further comprises:

a plurality of command arbiters configured to receive first output commands from the plurality of command queues.

19. The integrated circuit of claim 18, wherein the at least one scheduling circuit in the plurality of scheduling circuits further comprises:

a global arbiter configured to receive second output commands from the plurality of command arbiters and to output a single winning command from among the second output commands received from the plurality of command arbiters.

20. The integrated circuit of claim 19, wherein the at least one scheduling circuit in the plurality of scheduling circuits further comprises:

a plurality of safe checking circuits configured to monitor the single winning command output from the global arbiter.

* * * * *